United States Patent
Pan et al.

(10) Patent No.: US 12,181,370 B2
(45) Date of Patent: Dec. 31, 2024

(54) SIGNAL DETECTION METHOD AND OPTICAL TIME-DOMAIN REFLECTOMETER

(71) Applicant: Huawei Technologies Co., Ltd., Shenzhen (CN)

(72) Inventors: Chao Pan, Shenzhen (CN); Ziliang Li, Shenzhen (CN); Ning Deng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 17/961,004

(22) Filed: Oct. 6, 2022

(65) Prior Publication Data

US 2023/0031468 A1 Feb. 2, 2023

Related U.S. Application Data

(63) Continuation of application No. PCT/CN2021/083748, filed on Mar. 30, 2021.

(30) Foreign Application Priority Data

Apr. 9, 2020 (CN) .......................... 202010273424.0

(51) Int. Cl.
*G01M 11/00* (2006.01)
*H04B 10/071* (2013.01)

(52) U.S. Cl.
CPC .... *G01M 11/3127* (2013.01); *G01M 11/3145* (2013.01); *H04B 10/071* (2013.01)

(58) Field of Classification Search
CPC .. G01M 11/30; G01M 11/31; G01M 11/3109; G01M 11/3118; G01M 11/3127;
(Continued)

(56) References Cited

U.S. PATENT DOCUMENTS

| 6,122,044 A * | 9/2000 | Gautheron | G01M 11/3172 356/73.1 |
| 6,335,788 B1 * | 1/2002 | Uchiyama | G01M 11/3172 356/73.1 |

(Continued)

FOREIGN PATENT DOCUMENTS

| CN | 102142892 A | 8/2011 |
| CN | 102761364 A | 10/2012 |

(Continued)

OTHER PUBLICATIONS

Liokumovich, L., et al., "Fundamentals of Optical Fiber Sensing Schemes Based on Coherent Optical Time Domain Reflectometry: Signal Model Under Static Fiber Conditions," in Journal of Lightwave Technology, vol. 33, No. 17, Sep. 1, 2015, doi: 10.1109/JLT.2015.2449085, 12 pages.

(Continued)

*Primary Examiner* — Gordon J Stock, Jr.
(74) *Attorney, Agent, or Firm* — Conley Rose, P.C.

(57) ABSTRACT

An optical time-domain reflectometer (OTDR), where a laser emitting apparatus of the OTDR outputs a first optical signal in a first time period. A signal modulation apparatus of the OTDR generates a pulse signal based on the first optical signal, and outputs the pulse signal to an optical fiber in a second time period, where the first time period includes the second time period. A receiver of the OTDR receives a scattered signal from the optical fiber, where a frequency of the scattered signal is the same as a frequency of the first optical signal. Then, the laser emitting apparatus outputs a second optical signal in a third time period, where a frequency of the second optical signal is different from the frequency of the first optical signal. The second optical signal is used as a local oscillator signal to implement coherent detection in the receiver.

20 Claims, 4 Drawing Sheets

(58) Field of Classification Search
CPC ......... G01M 11/3136; G01M 11/3145; G01M 11/3154; G01M 11/3163; H04B 10/071; G01D 5/3535
See application file for complete search history.

(56) References Cited

U.S. PATENT DOCUMENTS

| | | | |
|---|---|---|---|
| 7,283,216 B1 | 10/2007 | Geng et al. | |
| 7,586,617 B2* | 9/2009 | Hartog | G01M 11/3145 356/447 |
| 7,859,654 B2* | 12/2010 | Hartog | G01M 11/3127 356/73.1 |
| 8,831,422 B2* | 9/2014 | Feng | G01M 11/3127 398/28 |
| 9,983,069 B2* | 5/2018 | Koizumi | G01D 5/35364 |
| 10,539,476 B2* | 1/2020 | Lecoeuche | G01M 11/3127 |
| 10,756,820 B2* | 8/2020 | Liu | H04B 10/548 |
| 11,143,528 B2* | 10/2021 | Hino | G01D 5/35361 |
| 11,171,722 B2* | 11/2021 | Dong | H04B 10/40 |
| 11,265,079 B2* | 3/2022 | Rochat | G01M 11/3118 |
| 11,867,555 B2* | 1/2024 | Wakisaka | G01D 5/35358 |
| 2013/0114954 A1 | 5/2013 | Feng et al. | |
| 2016/0245719 A1 | 8/2016 | Zou et al. | |

FOREIGN PATENT DOCUMENTS

| | | | |
|---|---|---|---|
| CN | 103217226 A | | 7/2013 |
| CN | 104426602 A | | 3/2015 |
| CN | 105490738 A | | 4/2016 |
| CN | 106533547 A | * | 3/2017 |
| CN | 110518969 A | | 11/2019 |
| EP | 2589948 A1 | | 5/2013 |
| EP | 3232165 A1 | | 10/2017 |
| WO | 2013097256 A1 | | 7/2013 |

OTHER PUBLICATIONS

Zhao, Y., et al., "High-performance and cost-effective C-OTDR employing polarization independent coherent detection," 2018 Conference on Lasers and Electro-Optics (CLEO), San Jose, CA, USA, 2018, 2 pages.

\* cited by examiner

SIGNAL DETECTION METHOD AND OPTICAL TIME-DOMAIN REFLECTOMETER

CROSS-REFERENCE TO RELATED APPLICATIONS

This application is a continuation application of International Patent Application No. PCT/CN2021/083748 filed on Mar. 30, 2021, which claims priority to Chinese Patent Application No. 202010273424.0 filed on Apr. 9, 2020. The disclosures of the aforementioned applications are hereby incorporated by reference in their entireties.

TECHNICAL FIELD

This application relates to the field of optical communications, and in particular, to a signal detection method and an optical time-domain reflectometer.

BACKGROUND

Due to uneven density and uneven doping components of a material of an optical fiber, and defects of the optical fiber, when light is transmitted in the optical fiber, scattering is caused at each point along a length of the optical fiber. A coherent optical time-domain reflectometer (C-OTDR) analyzes, by using a coherent detection technology, backscattered light generated when the light is propagated in the optical fiber, to obtain attenuation information that may be used to measure fiber attenuation and a splice loss, locate a fiber fault point, learn of loss distribution of the optical fiber along the length, and the like.

A current design of the C-OTDR is a heterodyne detection solution based on an acousto-optic modulator (AOM). Light emitted by a laser is split into two channels. One channel of light is coupled to a detector as a local oscillator signal, and the other channel of light is coupled to the AOM, so that the AOM performs modulation and adjusts a frequency of the light, to generate a pulse signal whose frequency is different from a frequency of the local oscillator signal. A scattered signal generated by the pulse signal in the to-be-measured optical fiber is coupled to the detector by using a circulator, to generate an interference effect with the local oscillator signal. However, the heterodyne detection solution in which the AOM adjusts the frequency of the pulse signal causes high power consumption of the C-OTDR.

SUMMARY

Embodiments of this application provide a signal detection method and an optical time-domain reflectometer (OTDR).

According to a first aspect, this application provides an OTDR, including a controller, a laser emitting apparatus, a signal modulation apparatus, a coupler, a signal coupling apparatus, and a receiver. The laser emitting apparatus is configured to output a first optical signal in a first time period based on a first control signal sent by the controller. The coupler is configured to couple the first optical signal to the receiver and the signal modulation apparatus. The signal modulation apparatus is configured to generate a pulse signal based on the first optical signal, and output the pulse signal in a second time period based on a second control signal sent by the controller, where the first time period includes the second time period. The signal coupling apparatus is configured to couple the pulse signal to an optical fiber, and couple a scattered signal from the optical fiber to the receiver, where a frequency of the scattered signal is the same as a frequency of the first optical signal. The laser emitting apparatus is configured to output a second optical signal in a third time period based on a third control signal sent by the controller, where a frequency of the second optical signal is different from the frequency of the first optical signal, and a start moment of the third time period is later than a stop moment of the first time period. The coupler is configured to couple the second optical signal to the receiver. The receiver is configured to perform coherent detection based on the second optical signal and the scattered signal.

In this implementation, the second optical signal may be used as a local oscillator signal to generate an interference effect with the scattered signal in the receiver, and the receiver implements coherent detection. Based on the foregoing descriptions, the optical signal output by the laser emitting apparatus is used as the local oscillator signal, and local oscillator signals with different frequencies are generated in different time periods, so that the frequency of the scattered signal is different from the frequency of the local oscillator signal. Therefore, a heterodyne detection solution is implemented, there is no need to adjust a frequency of the pulse signal, and power consumption is reduced.

In some possible implementations, the laser emitting apparatus includes a laser and a first driver. The first driver is configured to output a first current in the first time period based on the first control signal. The laser is configured to output the first optical signal in the first time period based on the first current. The first driver is configured to output a second current in the third time period based on the third control signal. The laser is configured to output the second optical signal in the third time period based on the second current. In this implementation, a specific implementation in which the laser emitting apparatus outputs optical signals with different frequencies based on the control signal of the controller is provided, to improve practicality of the solution.

In some possible implementations, the signal modulation apparatus includes a modulator and a second driver. The modulator is configured to generate the pulse signal based on the first optical signal. The second driver is configured to output a drive signal in the second time period based on the second control signal. The modulator is configured to output the pulse signal in the second time period based on the drive signal. In this implementation, a specific implementation in which the signal modulation apparatus outputs the pulse signal based on the control signal of the controller is provided, to further improve practicality of the solution.

In some possible implementations, the modulator is a Mach-Zehnder modulator (MZM), the first current is greater than the second current, and the frequency of the second optical signal is less than the frequency of the scattered signal. Alternatively, the modulator is a semiconductor optical amplifier (SOA), the first current is less than the second current, and the frequency of the second optical signal is greater than the frequency of the scattered signal. In this implementation, a plurality of types of modulators are provided, to improve scalability of the solution.

In some possible implementations, duration of the third time period is greater than or equal to target duration, and the target duration is equal to $2nL/C$, where $n$ represents a refractive index of the optical fiber, $L$ represents a length of the optical fiber, and $C$ represents a speed of light in vacuum. It should be understood that the OTDR generally needs to perform continuous detection, and transmission of the pulse signal in the optical fiber requires specific time. To ensure that two consecutive times of detection performed by the OTDR do not affect each other, a time interval between the two consecutive times of detection needs to be greater than or equal to the target duration (that is, the duration of the third time period is greater than or equal to the target duration), to ensure that scattered signals generated when two consecutive pulse signals are transmitted in the optical fiber do not overlap.

In some possible implementations, when the pulse signal is propagated in the optical fiber, a reflected signal may be further generated in addition to the scattered signal generated because a refractive index of a medium changes. For example, a movable connector, a mechanical splice, and the like on the optical fiber may cause reflection. The signal coupling apparatus is further configured to couple the reflected signal from the optical fiber to the receiver, where a frequency of the reflected signal is the same as the frequency of the first optical signal. The receiver is configured to perform coherent detection based on the second optical signal, the scattered signal, and the reflected signal to obtain more complete optical attenuation information.

In some possible implementations, a type of the signal coupling apparatus includes at least a coupler and a circulator.

According to a second aspect, this application provides a signal detection method, including generating a first optical signal in a first time period, next, generating a pulse signal based on the first optical signal, and outputting the pulse signal to an optical fiber in a second time period, where a frequency of the pulse signal is the same as a frequency of the first optical signal, and the first time period includes the second time period, then, generating a second optical signal in a third time period, where a frequency of the second optical signal is different from the frequency of the first optical signal, and a start moment of the third time period is later than a stop moment of the first time period, and further, performing coherent detection based on the second optical signal and a scattered signal from the optical fiber, where a frequency of the scattered signal is the same as the frequency of the first optical signal.

In some possible implementations, generating a first optical signal in a first time period includes generating a first current in the first time period, and generating the first optical signal in the first time period based on the first current, and generating a second optical signal in a third time period includes generating a second current in the third time period, and generating the second optical signal in the third time period based on the second current.

In some possible implementations, outputting the pulse signal to an optical fiber in a second time period includes generating a drive signal in the second time period, and outputting the pulse signal in the second time period based on the drive signal.

In some possible implementations, the first current is greater than the second current, and the frequency of the second optical signal is less than the frequency of the scattered signal. Alternatively, the first current is less than the second current, and the frequency of the second optical signal is greater than the frequency of the scattered signal.

In some possible implementations, duration of the third time period is greater than or equal to target duration, and the target duration is equal to 2nL/C, where n represents a refractive index of the optical fiber, L represents a length of the optical fiber, and C represents a speed of light in vacuum.

In some possible implementations, the performing coherent detection based on the second optical signal and a scattered signal from the optical fiber includes performing coherent detection based on the second optical signal and both the scattered signal and a reflected signal from the optical fiber, where a frequency of the reflected signal is the same as the frequency of the first optical signal.

In the embodiments of this application, the laser emitting apparatus outputs the first optical signal in the first time period. The signal modulation apparatus generates the pulse signal based on the first optical signal, and outputs the pulse signal to the optical fiber in the second time period, where the first time period includes the second time period. The receiver receives the scattered signal from the optical fiber, where the frequency of the scattered signal is the same as the frequency of the first optical signal. Then, the laser emitting apparatus outputs the second optical signal in the third time period, where the frequency of the second optical signal is different from the frequency of the first optical signal. The second optical signal may be used as the local oscillator signal to generate an interference effect with the scattered signal in the receiver, and the receiver implements coherent detection. Based on the foregoing descriptions, the optical signal output by the laser emitting apparatus is used as the local oscillator signal, and local oscillator signals with different frequencies are generated in different time periods, so that the frequency of the scattered signal is different from the frequency of the local oscillator signal. Therefore, the heterodyne detection solution is implemented, there is no need to adjust the frequency of the pulse signal, and power consumption is reduced.

DESCRIPTION OF EMBODIMENTS

Figure 1:
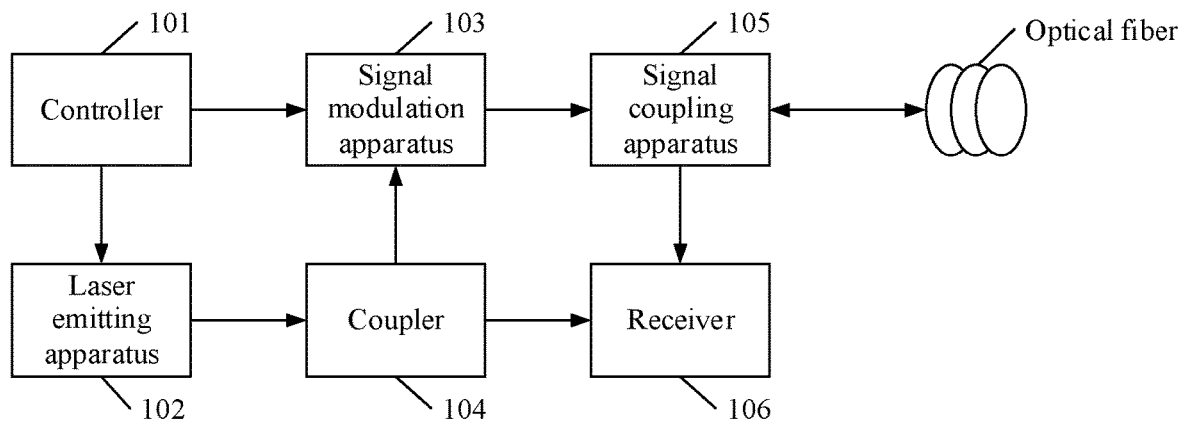
FIG. 1 is a schematic diagram of a structure of a first OTDR according to an embodiment of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, product, or device.

Embodiments of this application provide a signal detection method and an OTDR, to generate local oscillator signals with different frequencies in different time periods, so that a frequency of a scattered signal is different from the frequency of the local oscillator signal. Therefore, a heterodyne detection solution is implemented, there is no need to adjust a frequency of a pulse signal, and power consumption is reduced.

Some terms in this application are first described, so as to help persons skilled in the art have a better understanding.

(1) OTDR: The OTDR is produced based on light backscattering and the Fresnel reflection principle. The OTDR injects a series of light waves into an optical fiber for a test. When encountering mediums with different refractive indexes, the injected light wave is scattered and reflected back. Attenuation information is obtained by using backscattered light generated when light is propagated in the optical fiber, and may be used to measure fiber attenuation and a splice loss, locate a fiber fault point, learn of loss distribution of the optical fiber along a length, and the like.

(2) Dead zone: When detecting an optical fiber link, due to an impact of reflection, the OTDR cannot detect or accurately locate an event point and a fault point on the optical fiber link within a specific distance (or time). The distance (or time) herein is the dead zone. The OTDR generates the dead zone because a detector of the OTDR is temporarily "blinded" due to an impact of high-intensity Fresnel reflected light (which is mainly caused by an air gap between connection points of the OTDR). When high-intensity reflection is generated, a reflected optical signal received by the detector inside the OTDR enables the detector to be in a saturated state, and the detector needs to take specific time to recover from a saturated state to an unsaturated state, so as to read the optical signal again. During recovery of the detector, the OTDR cannot accurately detect the backscattered optical signal, to generate the dead zone.

(3) Homodyne detection: Homodyne detection is a type of interferometry. In homodyne detection, a to-be-measured signal is mixed with a known reference signal, and carrier frequencies of the to-be-measured signal and the reference signal are the same. In this way, an obtained interference light field may eliminate an impact caused by frequency noise of an electromagnetic wave.

(4) Heterodyne detection: Heterodyne detection is a type of interferometry. Heterodyne detection is an interference effect between two coherent electromagnetic waves whose frequencies are different but similar to each other, to modulate a frequency of a to-be-measured electromagnetic wave by mixing the to-be-measured electromagnetic wave with a reference signal.

FIG. 1 is a schematic diagram of a structure of a first OTDR according to an embodiment of this application. The OTDR includes a controller 101, a laser emitting apparatus 102, a signal modulation apparatus 103, a coupler 104, a signal coupling apparatus 105, and a receiver 106. The controller 101 is configured to control the laser emitting apparatus 102 and the signal modulation apparatus 103. Further, the laser emitting apparatus 102 outputs a first optical signal in a first time period based on a first control signal sent by the controller 101. The coupler 104 splits the first optical signal based on a power ratio, one channel of the first optical signal is coupled to the signal modulation apparatus 103, and the other channel of the first optical signal is coupled to the receiver 106. The signal modulation apparatus 103 generates a pulse signal by modulating the first optical signal, and outputs the pulse signal in a second time period based on a second control signal sent by the controller 101, where the first time period includes the second time period. The signal coupling apparatus 105 couples the pulse signal to an optical fiber. A scattered signal is generated when the pulse signal is propagated in the optical fiber. The signal coupling apparatus 105 couples the scattered signal to the receiver 106. The laser emitting apparatus 102 further outputs a second optical signal in a third time period based on a third control signal sent by the controller 101, where a frequency of the second optical signal is different from a frequency of the first optical signal, and a start moment of the third time period is later than a stop moment of the first time period. The coupler 104 couples the second optical signal to the receiver 106. The receiver 106 performs coherent detection based on the second optical signal and the scattered signal. It should be understood that, backscattered light generated when light is propagated in the optical fiber may be analyzed through coherent detection to obtain attenuation information that may be used to measure fiber attenuation and a splice loss, locate a fiber fault point, learn of loss distribution of the optical fiber along a length, and the like.

Further, in this embodiment of this application, the OTDR may be a C-OTDR, and analyzes, by using a coherent detection technology, the scattered signal generated when the light is propagated in the optical fiber.

It may be understood that, because the pulse signal is generated through modulation of the first optical signal, a frequency of the pulse signal is the same as the frequency of the first optical signal. Further, a frequency of the scattered signal generated when the pulse signal is propagated in the optical fiber is also the same as the frequency of the first optical signal. Therefore, the frequency of the scattered signal is different from the frequency of the second optical signal. The second optical signal is used as a local oscillator signal to generate an interference effect with the scattered signal in the receiver 106, to implement coherent detection. In other words, the OTDR in this application uses a heterodyne detection solution.

Based on a specific example, the following further describes a solution in which the OTDR in this application performs heterodyne detection.

Figure 2:
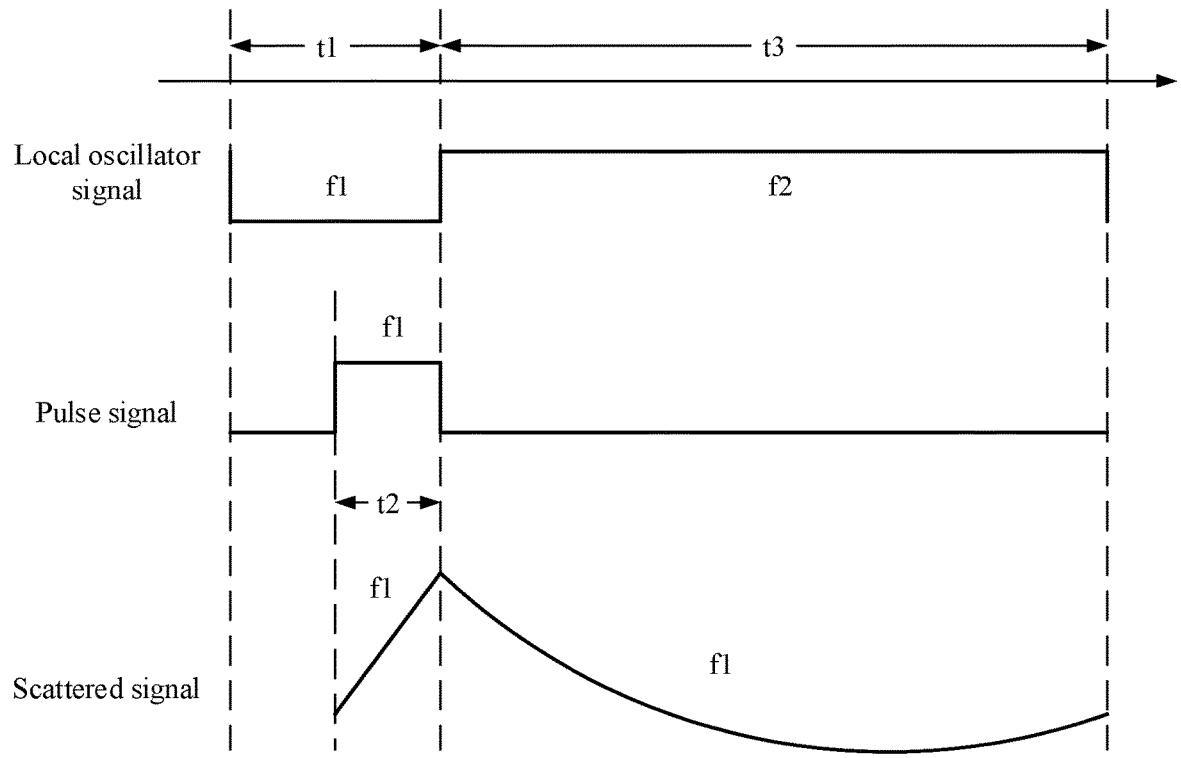
FIG. 2 is a control time sequence diagram of implementing coherent detection by an OTDR.

FIG. 2 is a control time sequence diagram of implementing coherent detection by an OTDR. A time sequence relationship among the local oscillator signal, the pulse signal, and the scattered signal may be learned from FIG. 2. It may be learned from the foregoing descriptions that the local oscillator signal is an optical signal transmitted and coupled by the laser emitting apparatus 102 to the receiver. In a time period t1, the local oscillator signal is the first optical signal, and a frequency thereof is f1. In a time period t3, the local oscillator signal is the second optical signal, and a frequency thereof is f2. The signal modulation apparatus 103 generates a pulse signal with the frequency f1 based on the first optical signal, and outputs the pulse signal in a time period t2. The time period t1 includes the time period t2. In other words, the signal modulation apparatus 103 no longer generates a pulse signal in the time period t3 based on the second optical signal. In a process from starting to enter the optical fiber to totally entering the optical fiber by the pulse signal, a dead zone of the OTDR appears. For example, the time period t2 shown in FIG. 2 is the dead zone. In this time period in which the dead zone occurs, the receiver 106 cannot normally detect a scattered signal with the frequency f1, and cannot perform coherent detection. After the dead zone ends, the receiver 106 may normally receive the scattered signal, and further the receiver 106 performs coherent detection based on the local oscillator signal and the scattered signal. For example, if the receiver 106 starts to normally receive the scattered signal in the time period t3, the receiver performs coherent detection based on the second optical signal with the frequency f2 and the scattered signal.

It may be understood that a specific time period in which the OTDR generates the dead zone does not necessarily strictly correspond to the time period t2, provided that the receiver 106 may perform coherent detection based on the second optical signal and the scattered signal after the dead zone ends. This is not limited herein.

It should be noted that, in actual application, if duration of the time period t2 is greater than duration of the dead zone, the receiver 106 may also perform coherent detection based on the first optical signal and the scattered signal, that is, a homodyne detection solution is used. For example, the duration of the dead zone is t0, and t2 includes t0. In this case, the receiver 106 performs homodyne detection in a time period t2-t0, and performs heterodyne detection in the time period t3.

Optionally, when the pulse signal is propagated in the optical fiber, a reflected signal may be further generated in addition to the scattered signal generated because a refractive index of a medium changes. For example, a movable connector, a mechanical splice, and the like on the optical fiber may cause reflection. In this case, the receiver 106 further receives the reflected signal from the optical fiber in addition to the scattered signal from the optical fiber. Further, the receiver 106 performs coherent detection on the scattered signal and the reflected signal by using the second optical signal as the local oscillator signal. It may be understood that a frequency of the reflected signal is also different from the frequency of the second optical signal.

Optionally, the OTDR generally needs to perform continuous detection, and transmission of the pulse signal in the optical fiber requires specific time. To ensure that two consecutive times of detection performed by the OTDR do not affect each other, a time interval between the two consecutive times of detection needs to be greater than or equal to the target duration, to ensure that scattered signals generated when two consecutive pulse signals are transmitted in the optical fiber do not overlap. Further, the target duration is equal to 2nL/C, where n represents a refractive index of the optical fiber, L represents a length of the optical fiber, and C represents a speed of light in vacuum.

Figure 3:
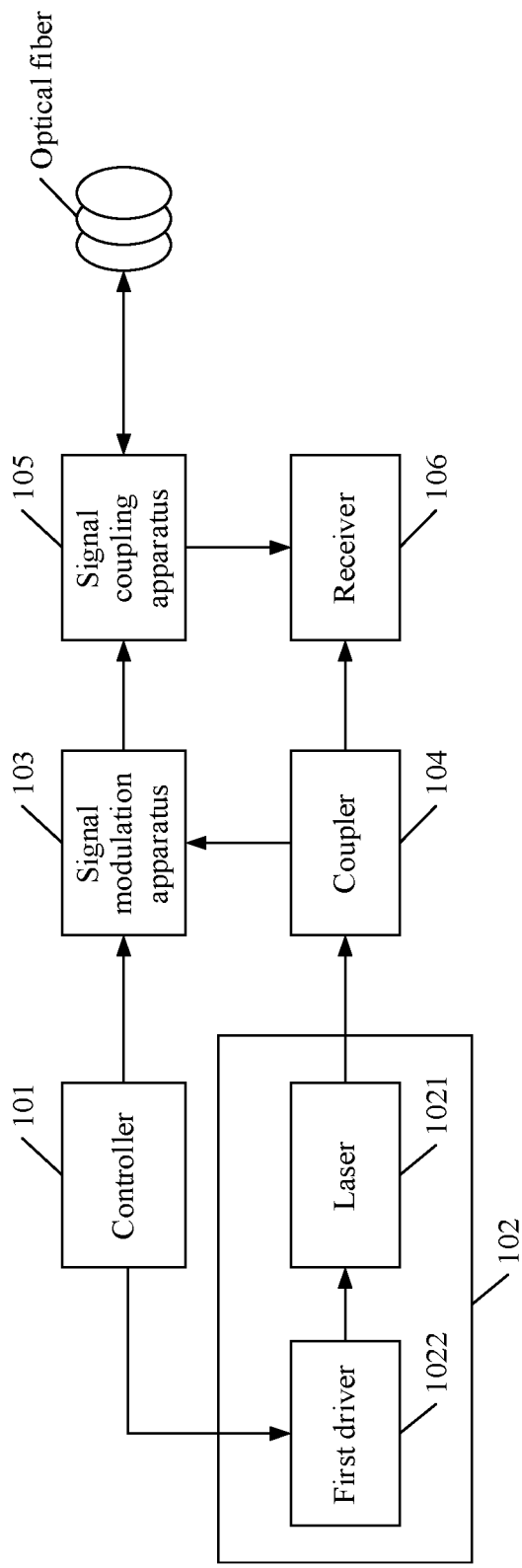
FIG. 3 is a schematic diagram of a structure of a second OTDR according to an embodiment of this application.

Optionally, FIG. 3 is a schematic diagram of a structure of a second OTDR according to an embodiment of this application. The laser emitting apparatus 102 includes a laser 1021 and a first driver 1022. Further, the first driver 1022 receives the first control signal sent by the controller 101, and outputs a first current I1 in the first time period t1 based on the first control signal. The laser 1021 generates the first optical signal with the frequency f1 based on the first current I1, and outputs the first optical signal in the first time period t1. In addition, the first driver 1022 receives the second control signal sent by the controller 101, and outputs a second current I2 in the third time period t3 based on the second control signal. The laser 1021 generates the second optical signal with the frequency f2 based on the second current I2, and outputs the second optical signal in the third time period t3.

Figure 4:
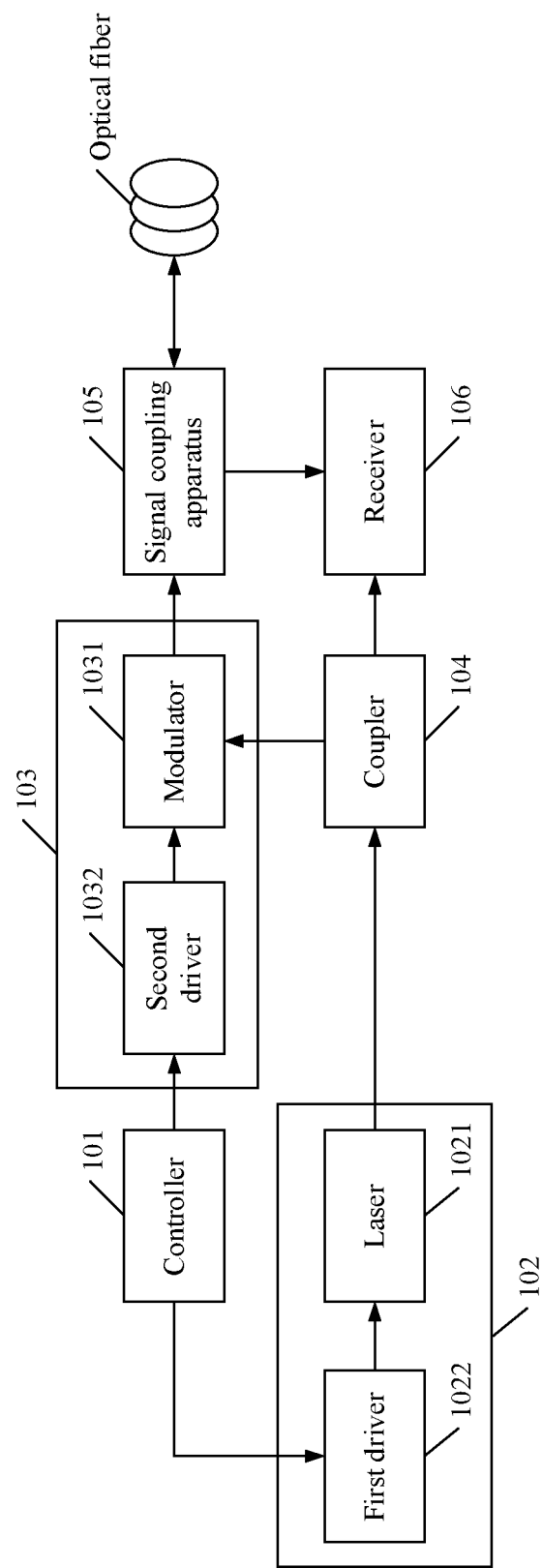
FIG. 4 is a schematic diagram of a structure of a third OTDR according to an embodiment of this application.

Optionally, FIG. 4 is a schematic diagram of a structure of a third OTDR according to an embodiment of this application. Based on the OTDR shown in FIG. 3, the signal modulation apparatus 103 includes a modulator 1031 and a second driver 1032. Further, the second driver 1032 receives the second control signal sent by the controller 101, and outputs a drive signal in the second time period t2 based on the second control signal. The modulator 1031 generates the pulse signal based on the first optical signal, and outputs the pulse signal in the second time period based on the drive signal.

It should be noted that the modulator 1031 may be a gain-type intensity modulator such as an SOA. Based on this type of modulator, the first current I1 is less than the second current I2, and the frequency f1 is greater than the frequency f2. In addition, the modulator 1031 may be a loss-type intensity modulator such as an. Based on this type of modulator, the first current I1 is greater than the second current I2, and the frequency f1 is less than the frequency f2. A specific type of the modulator is not limited in this application, and a modulator that can implement optical intensity modulation falls within the protection scope of this application.

Optionally, the controller 101 may be one or more integrated circuits configured to implement a function of the controller 101, for example, a micro control unit (MCU) and a central processing unit (CPU). This is not limited herein. The laser 1021 may be an apparatus configured to emit a laser beam, for example, a distributed feedback (DFB) laser or a Fabry-Perot (FB) laser. This is not limited herein. The signal coupling apparatus 105 may be an apparatus configured to implement signal coupling, for example, a circulator or a coupler. This is not limited herein.

In this embodiment of this application, the second optical signal may be used as the local oscillator signal to generate an interference effect with the scattered signal in the receiver, and the receiver implements coherent detection. Based on the foregoing descriptions, the optical signal output by the laser emitting apparatus is used as the local oscillator signal, and local oscillator signals with different frequencies are generated in different time periods, so that the frequency of the scattered signal is different from the frequency of the local oscillator signal. Therefore, the heterodyne detection solution is implemented, there is no need to adjust the frequency of the pulse signal, and power consumption is reduced.

The foregoing describes the OTDR provided in the embodiments of this application. In addition, this application further provides an OTDR-based signal detection method. The method is described below.

Figure 5:
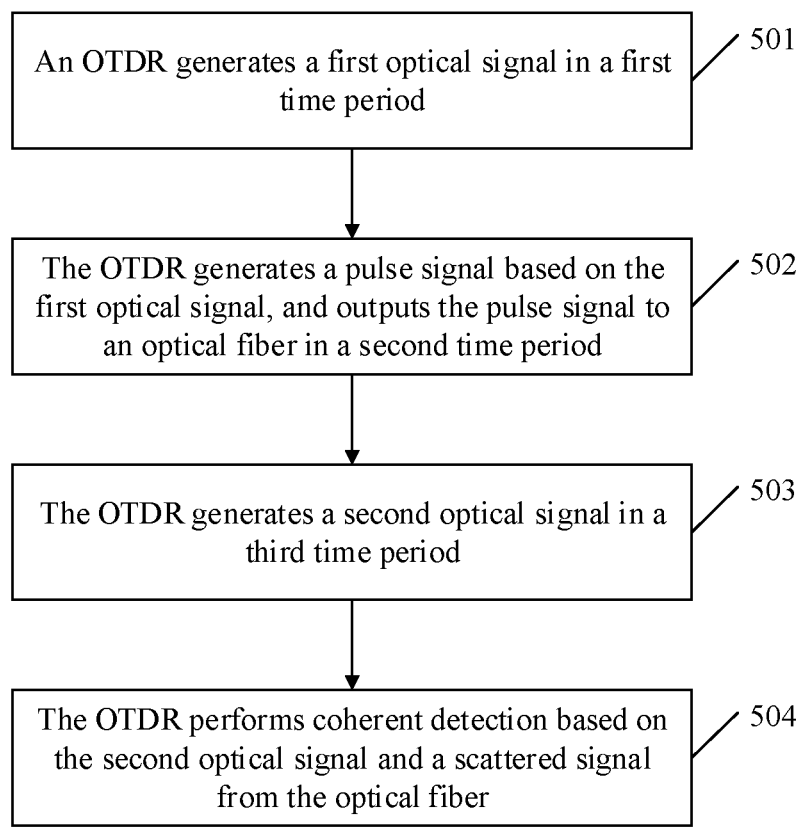
FIG. 5 is a schematic diagram of a signal detection method according to an embodiment of this application.

FIG. 5 is a schematic diagram of a signal detection method according to an embodiment of this application. The method includes the following steps.

501. An OTDR generates a first optical signal in a first time period.

502. The OTDR generates a pulse signal based on the first optical signal, and outputs the pulse signal to an optical fiber in a second time period.

In this embodiment, a frequency of the pulse signal is the same as a frequency of the first optical signal, and the first time period includes the second time period. For details, refer to FIG. 2. For example, the first time period is t1 shown in FIG. 2, and the second time period is t2 shown in FIG. 2.

503. The OTDR generates a second optical signal in a third time period.

In this embodiment, a frequency of the second optical signal is different from the frequency of the first optical signal, and a start moment of the third time period is later than a stop moment of the first time period. For details, refer to FIG. 2. The frequency of the first optical signal is f1, the frequency of the second optical signal is f2, and the third time period is t3 shown in FIG. 2.

504. The OTDR performs coherent detection based on the second optical signal and a scattered signal from the optical fiber.

It may be understood that, because the pulse signal is generated through modulation of the first optical signal, a frequency of the pulse signal is the same as the frequency of the first optical signal. Further, a frequency of the scattered signal generated when the pulse signal is propagated in the optical fiber is also the same as the frequency of the first optical signal. Therefore, the frequency of the scattered signal is different from the frequency of the second optical signal. The second optical signal is used as a local oscillator signal to generate an interference effect with the scattered signal, to implement coherent detection. In other words, the OTDR in this application uses a heterodyne detection solution.

Optionally, a specific implementation in which the OTDR generates the first optical signal in the first time period may be as follows. The OTDR generates a first current in the first time period, and further generates the first optical signal in the first time period based on the first current. A specific implementation in which the OTDR generates the second optical signal in the third time period may be as follows. The OTDR generates a second current in the third time period, and further generates the second optical signal in the third time period based on the second current. Because a value of the first current is different from a value of the second current, the frequency of the first optical signal is different from the frequency of the second optical signal.

Optionally, the first current is greater than the second current, and the frequency of the first optical signal is less than the frequency of the second optical signal, or the first current is less than the second current, and the frequency of the first optical signal is greater than the frequency of the second optical signal.

Optionally, after the OTDR generates the pulse signal based on the first optical signal, a specific implementation in which the OTDR outputs the pulse signal to the optical fiber in the second time period may be as follows. The OTDR generates a drive signal in the second time period, and further outputs the pulse signal in the second time period based on the drive signal.

Optionally, duration of the third time period is greater than or equal to target duration, and the target duration is equal to 2nL/C, where n represents a refractive index of the optical fiber, L represents a length of the optical fiber, and C represents a speed of light in vacuum.

Optionally, when the pulse signal is propagated in the optical fiber, a reflected signal may be further generated in addition to the scattered signal generated because a refractive index of a medium changes. In this case, the OTDR receives the reflected signal from the optical fiber in addition to the scattered signal from the optical fiber. Further, the OTDR performs coherent detection on the scattered signal and the reflected signal by using the second optical signal as the local oscillator signal. It may be understood that a frequency of the reflected signal is also different from the frequency of the second optical signal.

It should be noted that the signal detection method in this application may be implemented based on a structure of any one of the OTDRs shown in FIG. 1, FIG. 3, and FIG. 4. For example, referring to FIG. 1, the laser emitting apparatus 102 is configured to perform steps 501 and 503, the signal modulation apparatus 103 is configured to perform step 502, and the receiver 106 is configured to perform step 504. For details, refer to related descriptions of the foregoing embodiments shown in FIG. 1, FIG. 3, and FIG. 4. Details are not described herein again.

It should be noted that the foregoing embodiments are merely intended for describing the technical solutions of this application, instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An optical time-domain reflectometer (OTDR) comprising:
    a controller configured to:
        output a first control signal;
        output a second control signal; and
        output a third control signal;
    a laser coupled to the controller and configured to:
        output a first optical signal at a first frequency, during a first time period, and based on the first control signal; and
        output a second optical signal at a second frequency, during a third time period, and based on the third control signal, wherein a start moment of the third time period is later than a stop moment of the first time period;
    a receiver configured to perform coherent detection based on a combination of the second optical signal and a scattered signal;
    a first coupler coupled to the receiver and the laser and configured to:
        pass the first optical signal to the receiver and a signal modulation apparatus; and
        pass the second optical signal to the receiver,
    wherein the signal modulation apparatus is coupled to the first coupler and the controller and is configured to:
        generate a pulse signal based on the first optical signal; and
        output the pulse signal during a second time period based on the second control signal, wherein the first time period comprises the second time period; and
    a signal coupling apparatus coupled to the signal modulation apparatus and the receiver and configured to:
        couple the pulse signal to an optical fiber; and
        couple the scattered signal from the optical fiber to the receiver, wherein the scattered signal has the first frequency.

2. The OTDR of claim 1, wherein a duration of the third time period is greater than or equal to a target duration, wherein the target duration is equal to 2nL/c, wherein n represents a refractive index of the optical fiber, wherein L represents a length of the optical fiber, and wherein c represents a speed of light in a vacuum.

3. The OTDR of claim 1, wherein the signal coupling apparatus is further configured to couple a reflected signal from the optical fiber to the receiver, wherein the reflected signal has the first frequency, and wherein the receiver is further configured to further perform the coherent detection based on the reflected signal.

4. The OTDR of claim 1, wherein the signal coupling apparatus comprises a second coupler.

5. The OTDR of claim 1, wherein the signal coupling apparatus comprises a circulator.

6. The OTDR of claim 1, wherein the OTDR is a coherent OTDR (C-OTDR).

7. The OTDR of claim 1, wherein the laser comprises:
    a first driver configured to:

output a first current during the first time period based on the first control signal; and output a second current during the third time period based on the third control signal; and the laser is coupled to the first driver and configured to:

output the first optical signal during the first time period based on the first current; and output the second optical signal during the third time period based on the second current.

8. The OTDR of claim 7, wherein the laser is a distributed feedback (DFB) laser or a Fabry-Perot (FP) laser.

9. The OTDR of claim 7, wherein the signal modulation apparatus comprises:

a second driver configured to output a drive signal during the second time period based on the second control signal; and a modulator coupled to the second driver and configured to:

generate the pulse signal based on the first optical signal; and output the pulse signal during the second time period based on the drive signal.

10. The OTDR of claim 9, wherein the modulator is a Mach-Zehnder modulator (MZM), wherein the first current is greater than the second current, and wherein the second frequency is less than the first frequency of the scattered signal.

11. The OTDR of claim 9, wherein the modulator is a semiconductor optical amplifier (SOA), wherein the first current is less than the second current, and wherein the second frequency is greater than the first frequency of the scattered signal.

12. A signal detection method comprising:

generating a first optical signal during a first time period, wherein the first optical signal has a first frequency;

generating a pulse signal based on the first optical signal;

outputting the pulse signal to an optical fiber during a second time period, wherein the pulse signal has the first frequency, and wherein the first time period comprises the second time period;

generating a second optical signal during a third time period, wherein the second optical signal has a second frequency, and wherein a start moment of the third time period is later than a stop moment of the first time period; and performing coherent detection based on a combination of the second optical signal and a scattered signal from the optical fiber, wherein the scattered signal has the first frequency.

13. The signal detection method of claim 12, wherein a duration of the third time period is greater than a target duration, wherein the target duration is equal to 2nL/c, wherein n represents a refractive index of the optical fiber, wherein L represents a length of the optical fiber, and wherein c represents a speed of light in a vacuum.

14. The signal detection method of claim 12, further comprising further performing the coherent detection based on a reflected signal from the optical fiber, wherein the reflected signal has the first frequency.

15. The signal detection method of claim 12, wherein a duration of the third time period is equal to a target duration, wherein the target duration is equal to 2nL/c, wherein n represents a refractive index of the optical fiber, wherein L represents a length of the optical fiber, and wherein c represents a speed of light in a vacuum.

16. The signal detection method of claim 12, further comprising:

generating a first current in the first time period;

further generating the first optical signal during the first time period based on the first current;

generating a second current during the third time period; and further generating the second optical signal during the third time period based on the second current.

17. The signal detection method of claim 16, further comprising:

generating a drive signal during the second time period; and further outputting the pulse signal during the second time period based on the drive signal.

18. The signal detection method of claim 16, wherein the first current is greater than the second current, and wherein the second frequency is less than the fourth-first frequency of the scattered signal.

19. The signal detection method of claim 16, wherein the first current is less than the second current, and wherein the second frequency is greater than the first frequency of the scattered signal.

20. An optical time-domain reflectometer (OTDR) comprising:

a laser configured to:

output a first optical signal at a first frequency in a first time period, and output a second optical signal at a second frequency in a second time period, wherein a start moment of the second time period is later than a stop moment of the first time period;

an optical fiber configured to output a scattered signal;

a receiver configured to:

receive the scattered signal; and perform coherent detection based on a combination of the second optical signal and the scattered signal, wherein the scattered signal has the first frequency;

a signal modulation apparatus configured to:

generate a pulse signal based on the first optical signal; and output the pulse signal in a third time period;

a coupler coupled to the laser and configured to:

pass the first optical signal to the receiver and the signal modulation apparatus; and pass the second optical signal to the receiver; and a signal coupling apparatus coupled to the optical fiber and the receiver, wherein the signal coupling apparatus is configured to:

pass the pulse signal to the optical fiber; and pass the scattered signal from the optical fiber to the receiver.

* * * * *

UNITED STATES PATENT AND TRADEMARK OFFICE
CERTIFICATE OF CORRECTION

PATENT NO. : 12,181,370 B2
APPLICATION NO. : 17/961004
DATED : December 31, 2024
INVENTOR(S) : Chao Pan, Ziliang Li and Ning Deng It is certified that error appears in the above-identified patent and that said Letters Patent is hereby corrected as shown below:

In the Claims

Claim 18, Column 12, Line 24: "than the fourth-first frequency" should read "than the first frequency"

Signed and Sealed this
Eighteenth Day of February, 2025

Coke Morgan Stewart
*Acting Director of the United States Patent and Trademark Office*